United States Patent
Bonneville et al.

(10) Patent No.: US 9,319,941 B2
(45) Date of Patent: Apr. 19, 2016

(54) TRUST BASED SYSTEM AND METHOD FOR PERFORMING A HANDOVER FROM A SOURCE BASE STATION TO A TARGET BASE STATION

(71) Applicant: MITSUBISHI ELECTRIC CORPORATION, Chiyoda-ku (JP)

(72) Inventors: Herve Bonneville, Rennes (FR); Mourad Khanfouci, Rennes (FR)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 40 days.

(21) Appl. No.: 14/388,434

(22) PCT Filed: Mar. 19, 2013

(86) PCT No.: PCT/EP2013/055607
§ 371 (c)(1),
(2) Date: Sep. 26, 2014

(87) PCT Pub. No.: WO2013/143908
PCT Pub. Date: Oct. 3, 2013

(65) Prior Publication Data
US 2015/0087268 A1 Mar. 26, 2015

(30) Foreign Application Priority Data
Mar. 29, 2012 (EP) .................................... 12161945

(51) Int. Cl.
*H04W 36/00* (2009.01)
*H04W 12/08* (2009.01)
(Continued)

(52) U.S. Cl.
CPC ............ *H04W 36/0005* (2013.01); *H04W 4/08* (2013.01); *H04W 12/08* (2013.01);
(Continued)

(58) Field of Classification Search
CPC ............ H04W 12/08; H04W 36/0005; H04W 36/0038; H04W 36/04; H04W 36/245; H04W 36/34; H04W 36/38; H04W 4/08
See application file for complete search history.

(56) References Cited

U.S. PATENT DOCUMENTS

2007/0064647 A1* 3/2007 Prasad ................ H04L 63/0869
370/331
2010/0157943 A1 6/2010 Horn
(Continued)

FOREIGN PATENT DOCUMENTS

WO 2006/021236 A1 3/2006

OTHER PUBLICATIONS

International Search Report issued May 24, 2013, in PCT/EP2013/055607, filed Mar. 19, 2013.
(Continued)

*Primary Examiner* — Kashif Siddiqui
(74) *Attorney, Agent, or Firm* — Oblon, McClelland, Maier & Neustadt, L.L.P.

(57) ABSTRACT

A method performing handover of a mobile terminal from a source base station to a target base station, which can directly communicate with each other via first respective communication interfaces, and communicate via second respective communication interfaces with a core network entity, the core network entity managing subscriptions to services of at least the target base station and authorizing access to the services via handover to only subscribers to the services. The method includes: obtaining a trust level indication for the mobile terminal, representative of how much the mobile terminal can be trusted when declaring having subscribed to the services of the target base station; performing directly the handover via the first communication interfaces, when the obtained trust level indication is above a first threshold; and otherwise requesting authorization from the core network entity for the mobile terminal to access via handover the services of the target base station.

15 Claims, 7 Drawing Sheets

(51) Int. Cl.
*H04W 4/08* (2009.01)
*H04W 36/04* (2009.01)
*H04W 36/24* (2009.01)
*H04W 36/34* (2009.01)
*H04W 36/38* (2009.01)

(52) U.S. Cl.
CPC .......... *H04W36/0038* (2013.01); *H04W 36/04* (2013.01); *H04W 36/245* (2013.01); *H04W 36/34* (2013.01); *H04W 36/38* (2013.01)

(56) References Cited

U.S. PATENT DOCUMENTS

| | | | |
|---|---|---|---|
| 2010/0157944 A1 | 6/2010 | Horn | |
| 2010/0242089 A1* | 9/2010 | Bi | H04L 63/104 726/3 |
| 2010/0329205 A1* | 12/2010 | Bi | H04W 48/04 370/331 |
| 2014/0273949 A1* | 9/2014 | Duggan | H04L 12/6418 455/410 |

OTHER PUBLICATIONS

Written Opinion of the International Searching Authority issued May 24, 2013, in PCT/EP2013/055607, filed Mar. 19, 2013.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300, V11.1.0, Release 11, XP 050563902, Mar. 2012, 84 pages.

"Access Control for Inbound Handover from 3G Marco Cell to 3G HNB Cell", ZTE, 3GPP TSG-RAN WG3 Meeting #63bis, R3-090752, XP 050341139, Mar. 23-26, 2009, 4 pages.

* cited by examiner

TRUST BASED SYSTEM AND METHOD FOR PERFORMING A HANDOVER FROM A SOURCE BASE STATION TO A TARGET BASE STATION

The present invention generally relates to performing a handover from a source base station to a target base station, whereas access to services of the target base station is restricted to mobile terminals having subscribed to the services.

In LTE (Long-Term Evolution), UEs (User Equipments) are served by a core network via base stations, also referred to as eNodeBs. Each eNodeB manages a cell, wherein a cell is an area for which UEs located in the cell can be handled by the concerned base station, i.e. can communicate with a remote telecommunication device by accessing the core network via the base station.

Handover takes place when a UE moves from one cell to another. Two types of handover exist in LTE: S1 and X2 handovers. S1 handovers are performed between a source eNodeB and a target eNodeB via their S1 interfaces, wherein the S1 interface connects the considered eNodeB to the core network. X2 handovers are performed between the source eNodeB and the target eNodeB via their X2 interfaces, wherein the X2 interface directly connects the considered eNodeB to at least one neighbouring eNodeB. Two eNodeBs are considered as neighbours when their cells overlap. For mobility within an LTE system, X2 handovers are generally used when eNodeBs are directly connected via their X2 interfaces, except when the access to the cell served by the target eNodeB is restricted to a predefined set of subscribers (CSG for Closed Subscriber Group). In this case, S1 handovers are performed in order to allow the core network entities, and more particularly a connection management entity referred to as MME (Mobility Management Entity), to perform cell access control.

However performing S1 handover is time-consuming. S1 handover is moreover network resources consuming, as it requires data exchanges between the base stations and the core network entities.

It is desirable to overcome the aforementioned problems which occur in typical wireless cellular communications networks, and more particularly in LTE or LTE-A communications networks.

In particular, it is desirable to provide a solution that allows reducing the time needed to perform a handover for a user equipment, while ensuring a certain level of access control.

It is furthermore desirable to provide a solution that allows offloading traffic via the core network, while ensuring the certain level of access control.

It is furthermore desirable to provide a solution that is easy-to-implement and that is cost-effective.

To that end, the present invention concerns a method for performing a handover of a mobile terminal from a source base station to a target base station, the source and target base stations being adapted to directly communicate with each other via first respective communication interfaces, the source and target base stations being adapted to communicate via second respective communication interfaces with a core network entity, the core network entity managing subscriptions to services of at least the target base station and authorizing access to said services via handover to only subscribers to said services. The method is such that it comprises: obtaining a trust level indication for the mobile terminal, said trust level indication being representative of an extent to which the mobile terminal can be trusted when declaring having subscribed to the services of the target base station; performing directly the handover via the first communication interfaces, when the obtained trust level indication is above a first threshold; and otherwise requesting authorization from said core network entity for the mobile terminal to access the services of the target base station.

Thus, the time needed to perform the handover for the mobile terminals may be reduced, while a certain level of access control to services of the target base station is ensured. Offloading of traffic originally performed via the core network is moreover achieved, while ensuring the certain level of access control.

It has to be understood that the core network entity represents a single device of the core network or plural devices of the core network providing the functionality of managing subscriptions to services of the target base station and authorizing access to said services via handover to only subscribers to said services.

According to a particular feature, the trust level indication is determined as a function of a time period elapsed since a preceding modification of the trust level indication or since a preceding authorization from the core network entity for the mobile terminal to access via handover the services of the target base station.

Thus, the trust level indication may be adjusted to avoid that a handover without requesting authorization from the core network entity be performed for the mobile terminal, whereas no authorization from the core network entity has been requested for a long time period.

According to a particular feature, the trust level indication is determined as a function of a number of successive handovers performed by base stations by directly communicating with each other without requesting authorization from said core network entity and undergone by the mobile terminal to enter a cell managed by the source base station.

Thus, access control is reinforced, as the trust level indication may be adjusted in order to avoid numerous handovers without requesting authorization to the core network entity.

According to a particular feature, the core network entity defines the first threshold on the basis of an offload policy of signalling from the core network toward base stations.

Thus, flexibility is added to the signalling offload between the core network entity and the base stations and access control policies can be adjusted by the core network entity for each base station.

According to a particular feature, the target base station defines or adjusts the first threshold for the source base station, on the basis of an access policy to the services of the target base station.

Thus, signalling offload between the core network entity and base stations is handled locally by each base station. This adds reactivity to the overall handover and offloading procedures to fast variations of transmission conditions.

According to a particular feature, the trust level indication is defined on the basis of at least one parameter weighted by at least one respective forgetting factor, and: the at least one forgetting factor is adjusted by said core network entity on the basis of an offload policy of signalling from the core network toward base stations; or the at least one forgetting factor is adjusted by the target base station on the basis of an access policy to the services of the target base station.

Thus, signalling offload between the core network entity and base stations can be adjusted.

According to a particular feature, the target base station performs: receiving from the source base station a request to perform directly the handover via the first communication interfaces for the mobile terminal and receiving from the source base station said trust level indication; accepting to perform directly the handover via the first communication interfaces for the mobile terminal, when the trust level indication is above a first threshold; and otherwise requesting, via the second communication interface of the target base station, authorization from said core network entity for the mobile terminal to access the services of the target base station.

Thus, the process is kept simple for the source base station which simply needs to request a handover via the first communication interfaces even though the access to the services of the target base station is restricted. The process is moreover kept simple for the core network entity, which saves processing resources of the core network entity. The target base station is then able to decide on its own whether any access control needs to be performed by the core network entity, and this from whatever neighbouring base station the handover is requested.

According to a particular feature, the core network entity performs, when the trust level indication is above the first threshold: instructing the source base station to perform directly, via the first communication interfaces, following handovers toward the target base station for the mobile terminal.

Thus, the offloading level of signalling from the core network toward base stations can be tuned by the core network entity.

According to a particular feature, the source base station performs, when detecting that the handover has to be performed toward the target base station for the mobile terminal: performing the handover via its first communication interface, when instructed by the core network entity to perform directly, via the first communication interfaces, handovers toward the target base station for the mobile terminal; and otherwise requesting, via the second communication interface of the source base station, authorization from said core network entity for the mobile terminal to access via handover the services of the target base station.

Thus, the process performed by the source base station is kept simple and cost-effective.

According to a particular feature, the core network entity performs, when the trust level indication is below or equal to the first threshold: instructing the source base station to stop performing directly, via the first communication interfaces, following handovers toward the target base station for the mobile terminal.

Thus, the core network entity can trigger access control in order to reinforce the security of access to services of the target base station, for instance when offloading becomes less necessary according to transmission conditions via the core network or to effective consumption of processing resources of the core network entity.

According to a particular feature, the source base station performs, when detecting that the mobile terminals enters a cell managed by the source base station: obtaining a number of successive handovers performed by base stations by directly communicating with each other without requesting authorization from said core network entity and undergone by the mobile terminal to enter the cell managed by the source base station; and, when detecting that the handover has to be performed toward the target base station for the mobile terminal: performing directly the handover via its first communication interface, when said number of successive handovers is below a second threshold, independently of being instructed by the core network entity to perform directly, via the first communication interfaces, following handovers toward the target base station for the mobile terminal; and otherwise requesting, via the second communication interface of the source base station, authorization from said core network entity for the mobile terminal to access via handover the services of the target base station.

Thus, the source base station is able to trigger an access control by the core network entity in order to avoid numerous handovers without requesting authorization to the core network entity.

According to a particular feature, said method is performed by the source base station.

Thus, message exchanges between the source base station, the target base station and the core network entity are limited.

According to a particular feature, when the handover is performed directly via its first communication interface, the source base station transmits to the target base station a mobile terminal context including the trust level indication and/or a number of successive handovers performed by base stations by directly communicating with each other without requesting authorization from said core network entity and undergone by the mobile terminal to enter a cell managed by the source base station.

Thus, the management of the trust level indication can take into account, in a cost-effective way, an activity history of the mobile terminal.

According to a particular feature, requesting authorization from said core network entity for the mobile terminal to access via handover the services of the target base station is performed when performing the handover via the second communication interfaces.

Thus, when the trust level indication is above the first threshold, the handover is directly performed between the source and target base stations without access control by the core network entity. When implemented in the LTE context, it means that an X2 handover is performed when the trust level indication is above the first threshold, and that an S1 handover is performed otherwise.

The present invention also concerns a system for performing a handover of a mobile terminal from a source base station to a target base station, the source and target base stations being adapted to directly communicate with each other via first respective communication interfaces, the source and target base stations being adapted to communicate via second respective communication interfaces with a core network entity, the core network entity managing subscriptions to services of at least the target base station and authorizing access to said services via handover to only subscribers to said services. The system is such that it implements: means for obtaining a trust level indication for the mobile terminal, said trust level indication being representative of an extent to which the mobile terminal can be trusted when declaring having subscribed to the services of the target base station; means for performing the handover via the first communication interfaces, when the obtained trust level indication is above a first threshold; and otherwise means for requesting, via the second communication interfaces, authorization from said core network entity for the mobile terminal to access the services of the target base station.

The term system as used herein refers to either a device, a plurality of devices cooperating to implement the aforementioned means or causing the implementation of the aforementioned means.

The present invention also concerns, in at least one embodiment, a computer program that can be downloaded from a communication network and/or stored on a medium that can be read by a computer and run by a processor. This computer program comprises instructions for implementing the aforementioned method in any one of its embodiments, when said program is run by the processor. The present invention also concerns information storage means, storing such a computer program.

Since the features and advantages related to the system and to the computer program are identical to those already mentioned with regard to the corresponding aforementioned methods, they are not repeated here.

The characteristics of the invention will emerge more clearly from a reading of the following description of an example of embodiment, said description being produced with reference to the accompanying drawings, among which.

Even though the following description details the present invention in the scope of a deployment of wireless cellular communications networks of LTE or LTE-A type, the principles detailed hereinafter can be similarly applied in the deployment of other kinds of wireless cellular communications networks. More particularly, the principles detailed hereinafter can be similarly applied for performing a handover from a first base station to a second base station, wherein access to services of at least the second base station is restricted to a predefined group of subscribers and wherein the first and second base stations comprise interface means for directly communicating with each other, in addition to interface means with a core network comprising an entity checking whether a mobile terminal is authorized to access the services of the second base station. The process perform by said core network entity for checking whether a mobile terminal is authorized to access the services of a base station is also referred to as access control.

Figure 1:
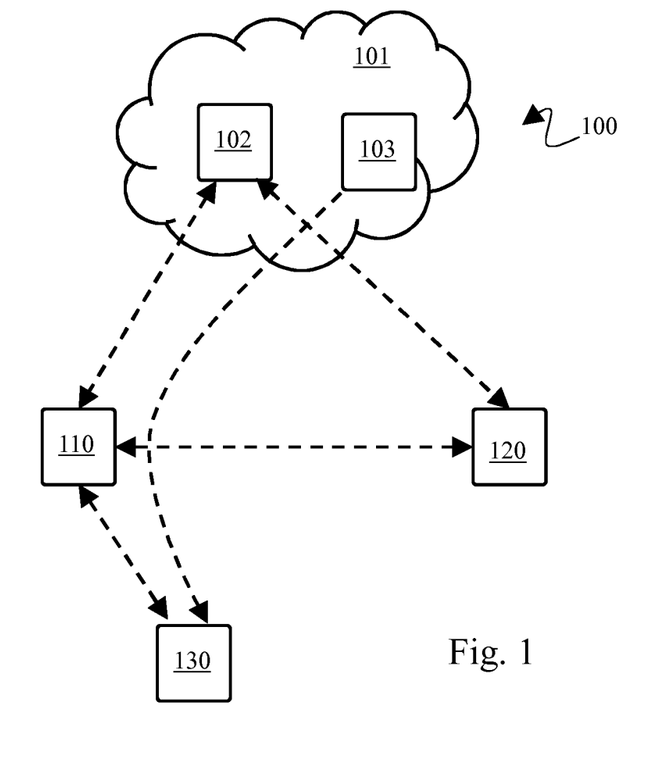
FIG. 1 schematically represents part of a wireless cellular communications network in which the present invention may be implemented.

FIG. 1 schematically represents part of a wireless cellular communications network 100 in which the present invention may be implemented.

The part of the wireless cellular communications network 100 shown in FIG. 1 comprises a core network 101. In the context of the 3GPP's SAE (System Architecture Evolution), the core network 101 comprises core network entities, such as MME 102 and HSS (Home Subscriber Server) 103 entities. The MME 102 is responsible for signalling in the wireless cellular communications network 100 and ensuring the connection management throughout the wireless cellular communications network 100. Several MMEs may exist in the wireless cellular communications network 100. The HSS 103 is a database containing user-related and subscription-related information. The MME 102 is also responsible for authenticating the user of any UE or mobile terminal, such as a UE 130, requesting access to services of the wireless cellular communications network 100 by interacting with the HSS 103.

Access to the services of the wireless cellular communications network 100 for the UE 130 is provided via a base station, or eNodeB, managing a cell in which the UE 130 is located.

In the description hereafter, a handover from a cell managed by a first base station 110, referred to as source base station, to a cell managed by a second base station 120, referred to as target base station, is considered. The cells are hereinafter referred to as source cell and target cell respectively.

Moreover, it is considered that the target cell 120 is a CSG cell. It means that services of the target base station are only accessible by members of a predefined CSG. Such services are for instance access to the target cell. CSGs can be identified by CSG identities, also referred to as CSG IDs. Each base station managing a CSG cell broadcasts in the cell the CSG identity corresponding to the CSG cell.

The target cell may also be operated as a hybrid cell, which means it is accessed as a CSG cell by members of the corresponding CSG and as a normal cell by all other mobile terminals or UEs. In hybrid cells, members of the corresponding CSG are expected to receive preferential access to the services of the wireless cellular communications network 100. The meaning of the terms CSG cell as used herein also covers hybrid cells, as hybrid cells comprise the functionalities related to CSG management.

Therefore, the MME 102, in collaboration with the HSS 103, manages subscriptions to the services of the target base station 120 and authorises access to these services via handover to only subscribers of these services.

The source 110 and target 120 base stations comprise respective communication interfaces with the core network, as well as respective communication interfaces with neighbouring base stations. In other words, according to LTE terminology, the source 110 and target 120 base stations comprise S1 and X2 interfaces.

Figure 2:
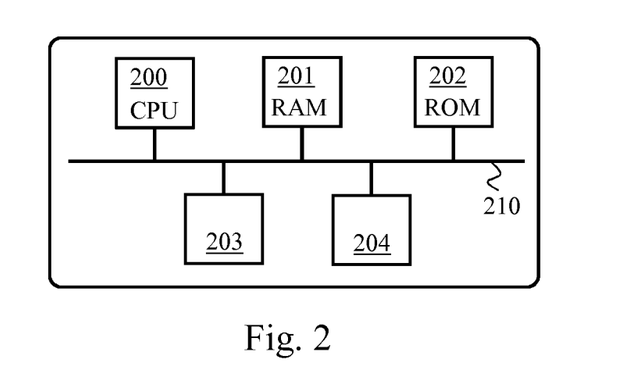
FIG. 2 schematically represents an architecture of a base station, a home base station or a core network entity of the wireless cellular communications network.

FIG. 2 schematically represents an architecture of a base station or a core network entity of the wireless cellular communications network 100. Generally speaking, the architecture refers to a telecommunication device.

According to the shown architecture, the telecommunication device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard Disk Drive) 203, or any other device adapted to read information stored on storage means; and, at least one communication interface 204.

CPU 200 is capable of executing instructions loaded into RAM 201 from ROM 202, from an external memory such as an SD (Secure Digital) card, or from HDD 203. After the telecommunication device has been powered on, CPU 200 is capable of reading instructions from RAM 201 and executing these instructions. The instructions form one computer program that causes CPU 200 to perform some or all of the steps of at least one of the algorithms described hereafter with regard to FIGS. 3, 4, 5, 6A, 6B, 6C, 7, 8A, 8B, 8C, 8D, 9A and 9B.

Any and all steps of the algorithms described hereafter with regard to FIGS. 3, 4, 5, 6A, 6B, 6C, 7, 8A, 8B, 8C, 8D, 9A and 9B may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 3:
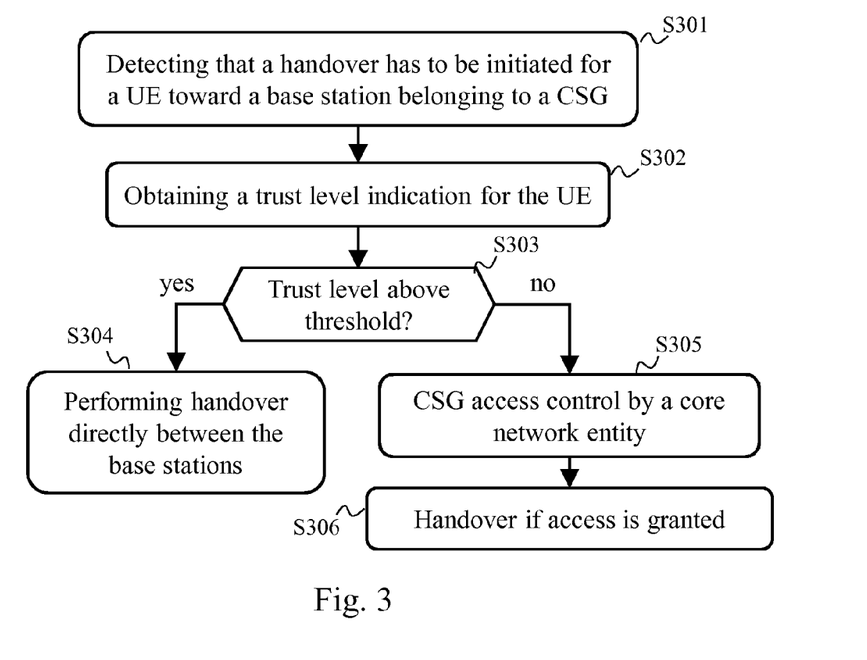
FIG. 3 schematically represents an algorithm for performing a handover, according to the present invention.

FIG. 3 schematically represents an algorithm illustrating a method for performing a handover from the source cell to the target cell.

The method comprises a step S301 of detecting that a handover has to be initiated for the UE 130 from the source base station 110 to the target base station 120. There may be different reasons why a handover might be initiated. For instance:

when the UE 130 is moving away from the area covered by the source cell and entering the area covered by the target cell, in order to avoid call or connection termination when the UE 130 gets outside the range of the source cell; or when the capacity for connecting new calls, or setting up new connections, of the source cell is reached, in order to free some capacity in the source cell for other UEs.

The method further comprises a following step S302 of obtaining a trust level indication for the UE 130. The trust level indication is information representative of the extent to which the UE 130 can be trusted by the source base station 110 and/or the target base station 120, when the UE 130 declares having subscribed to the services of the target base station 120. Embodiments for determining the trust level indication are detailed hereafter.

In order to enter a CSG cell, the UE 130 provides a CSG membership indication to the source base station 110. Indeed, following LTE requirements to facilitate access control, the UE 130 stores a list, called CSG whitelist, containing one or more CSG ID associated with the CSG cells in which the UE is allowed to access. In other words, the CSG whitelist is a list of services subscribed by the UE 130. The UE 130 uses the CSG whitelist along with the CSG ID broadcast by the CSG cell for CSG cell selection and reselection.

The CSG whitelist is maintained and provided to the UE 130 by the MME 102, or another core network entity, via the base station managing the cell in which the UE 130 is located. The MME 102 is connected, in the core network 101, to a CSG server (not shown) in charge of managing the CSG subscriptions. When a change occurs in the CSG subscriptions, leading to a change in the CSG whitelist of the UE 130, the CSG server instructs the MME 102 to provide the up-to-date CSG whitelist to the UE 130.

The method further comprises a following step S303 of checking whether the trust level is above a first threshold. If the trust level, or the trust level indication, for the UE 130 is above the first threshold, a step S304 is performed; otherwise a step S305 is performed.

In the step S304, the handover is performed directly between the source 110 and target 120 base stations. It means that no access control is performed beforehand by the MME 102 or another core network entity. The source 110 and target 120 base stations therefore use their X2 interfaces for performing the handover. No CSG subscription for the UE 130 is therefore verified, i.e. no access control to the services of the target base station 120 is performed, by the MME 102 or another core network entity.

In the step S305, the CSG subscription for the UE 130 is verified by the MME 102 or another core network entity.

If the access to the services of the target base station 120 is granted, in a step S306, the handover is performed. The handover may be performed via the core network 101 or between the source 110 and target 120 base stations without any core network entity further intervening.

It can be noticed that the access control to the services of the target base station 120 may be performed when initiating the handover via the core network 101, i.e. when the source base station 110 uses its S1 interface for initiating the handover.

Thus, when the handover is performed directly between the source 110 and target 120 base stations, the handover process is much faster than via the core network 101. By appropriately defining the first threshold and setting the trust level, the security in restricting access to the cell managed by the target base station 120 for only UEs having the adequate CSG subscription is maintained. Offloading of signalling via the core network 101 is furthermore achieved.

It should be noticed that, once the handover is performed, the target base station 120 becomes a source base station in the meaning of the present invention.

Three embodiments are described hereinafter. In a first embodiment, the comparison between the trust level indication and the first threshold is performed by a core network entity, such as the MME 102, which further instructs the source base station 110 whether the handover toward the target cell should be performed with access control by the core network entity. The first embodiment is described hereafter with regard to FIGS. 4, 5, 6A, 6B and 6C. In a second embodiment, the comparison between the trust level indication and the first threshold is performed by the source base station 110, which decides whether the handover toward the target cell should be performed with access control by the core network entity. The second embodiment is described hereafter with regard to FIGS. 7, 8A, 8B, 8C and 8D. In a third embodiment, the comparison between the trust level indication and the first threshold is performed by the target base station 120, which decides whether the handover toward the target cell should be performed with access control by the core network entity. The third embodiment is described hereafter with regard to FIGS. 9A and 9B.

Figure 4:
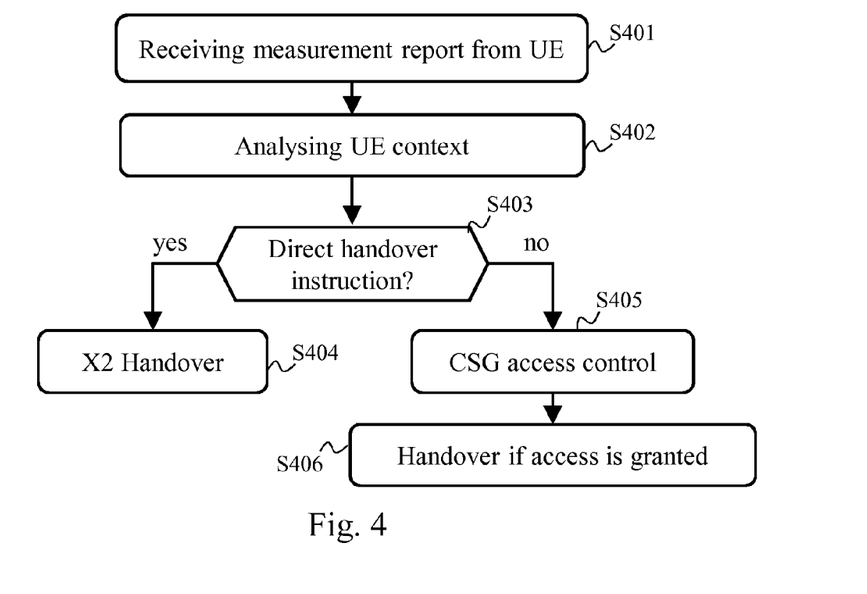
FIG. 4 schematically represents an algorithm performed by a source base station for performing the handover, according to a first embodiment.

FIG. 4 schematically represents an algorithm performed by the source base station 110 for performing the handover, according to the first embodiment.

In the first embodiment, the trust level indication associated with the UE 130 is managed by the MME 102, or another core network entity.

In a step S401, the source base station 110 receives measurement report from the UE 130.

The UE 130 periodically performs downlink radio channel measurements when receiving reference symbols (RS) from the source base station 110 and neighbouring base stations, such as the target base station 120. Downlink radio channel measurements are based on reference symbols received power (RSRP) and reference symbols received quality (RSRQ), as detailed in the 3GPP document TS 36.214, "*Evolved Universal Terrestrial Radio Access (E-UTRA) Physical Layer—Measurements*".

The UE 130 transmits to the source base station 110 measurement reports. Measurements are indicative of signal quality transmitted by neighbouring base stations, such as the target base station 120, and received by the UE 130. The source base station 110 uses the measurement reports to detect whether handover conditions are fulfilled for the UE 130 and to trigger a handover. For instance, when a handover is triggered on the basis of RSRP, the handover is triggered when RSRP for the target base station 120 is higher than RSRP for the source base station 110 by a predefined number of decibels for a certain time period.

The measurement report indicates the target cell, as identified by CGI (Cell Global Identity) or PCI (Physical Cell Identifier) information. The measurement report further indicates CSG membership of the UE 130, i.e. whether, from the point of view of the UE 130, the CSG ID transmitted by the target base station 120 is included in the CSG whitelist stored by the UE 130.

The trust level indication is representative of the extent to which the UE 130 can be trusted by the source base station 110 about the CSG membership indication reported by the UE 130.

In a following step S402, the source base station 110 analyses a UE context associated with the UE 130.

Whenever the UE 130 becomes active, i.e. makes a transition from idle to active mode, under the coverage of a base station, the MME 102 provides a UE context for the UE 130 to this base station using a dedicated message, referred to as Initial Context Setup Request message in LTE. The UE context includes information needed by the source base station 110 to manage the UE 130 for the duration of its activity in the cell, such as for example UE capabilities and the list of bearers that are established for the UE 130. Following a transition back to idle mode, identified by a message, referred to as UE Context Release Command in LTE, transmitted by the MME 102, the base station releases the UE context for the UE 130. Only the UE context in the MME 102 then remains.

The UE context stores an indication whether X2 handovers are allowed for the UE 130 toward CSG cells. This indication is provided by the MME 102, as detailed hereafter with regard to FIG. 5.

In a following step S403, the source base station 110 checks whether X2 handovers are allowed for the UE 130 toward CSG cells. If X2 handovers are allowed, a step S404 is performed; otherwise, a step S405 is performed.

In the step S404, the source base station 110 performs the handover directly with the target base station 120. The source base station 110 and target base station 120 therefore use their X2 interfaces for performing the handover. There is no implication of the MME 102 nor any core network entity in this case. When the X2 handover is completed between the source base station 110 and the target base station 120, the MME 102 is however notified by the target base station 120 that a handover has been performed for the UE 130. In LTE, the target base station 120 transmits a Path Switch Request message to the MME 102 in order to inform the MME 102 that the UE 130 has changed cell and to instruct the MME 102 to update routing accordingly. The MME 102 determines that an X2 handover has been performed for the UE 130 upon receiving the Path Switch Request message.

During the X2 handover process, the source base station 110 transmits the UE context associated with the UE 130 to the target base station 120. The source base station 110 then releases the UE context associated with the UE 130, upon being instructed to do so by the target base station 120. In LTE, the target base station 120 transmits a UE Context Release message to instruct the source base station 110 to release the UE context associated with the UE 130.

In the step S405, the source base station 110 requests that the CSG subscription for the UE 130 be verified by the MME 102 or another core network entity. The source base station 110 provides the UE membership indication and the CSG ID of the target cell, as received from the UE 130 in the step S401, to the MME 102 for checking. The MME 102 checks, in collaboration with the CSG server, that the UE membership indication is conform to the CSG subscription for the UE 130, and that the UE 130 is authorized to access the target cell.

If the access to the services of the target base station 120 is granted, in a step S406, the handover is performed.

The handover may be performed directly between the source 110 and target 120 base stations, via their X2 interfaces. In this case, the source base station 110 receives from the MME 102 an indication that the access to the target cell is granted to the UE 130. The source base station 110 then initiates the handover toward the target cell via its X2 interface.

In a variant, the handover may be performed via the core network. The source base station 110 requests an S1 handover toward the target cell, the request comprising the UE membership indication and the CSG ID of the target cell. When receiving the request, the MME 102 verifies the subscription of the UE 130.

Upon success of the verification, the MME 102 forwards the handover request to the target base station 120 and the handover process continues between the source 110 and target 120 base stations via the core network 101, namely via their S1 interfaces. During the S1 handover process, the UE context is provided to the target base station 130 in part by the source base station 110, relayed by the MME 102, and in part directly by the MME 102. After handover completion, the source base station 110 then releases the UE context associated with the UE 130, upon receiving of the UE Context Release message from the MME 102, as specified in the 3GPP document TS 23.401 "*General Packet Radio Service (GPRS) enhancements for Evolved Universal Terrestrial Radio Access Network (E-UTRAN) access*".

In one embodiment, the source base station 110 may decide to stop triggering X2 handovers toward CSG cells for UEs when a number of successive X2 handovers toward CSG cells without access control undergone by said UEs to enter the source cell is above a second threshold, without receiving instructions from the MME 102. It allows limiting the exchanges over the S1 interface. In this case, the source base station 110 determines the number of successive X2 handovers toward CSG cells without access control for the UE 130 from the UE context received during the X2 handover from the base station from which cell the UE 130 is coming. Determining the number of successive X2 handovers toward CSG cells without access control is further detailed hereafter with regard to FIG. 7.

Figure 5:
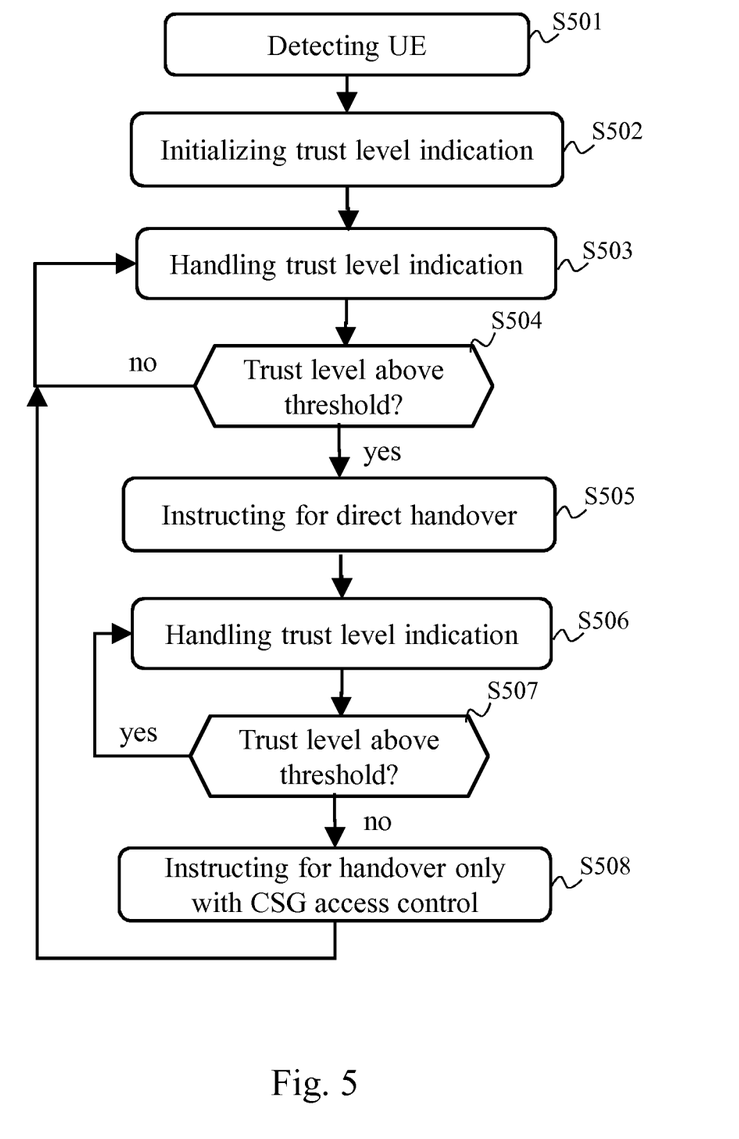
FIG. 5 schematically represents an algorithm performed by a core network entity for performing the handover, according to the first embodiment.

FIG. 5 schematically represents an algorithm performed by a core network entity, preferably the MME 102, for performing the handover, according to the first embodiment.

In a step S501, the MME 102 detects the presence of the UE 130 in one of the cells managed by base stations connected to the MME 102. In the case considered herein, the MME 102 detects the presence of the UE 130 in the source cell. The MME 102 for instance detects that the UE 130 switches from idle mode to active mode in the source cell.

In a following step S502, the MME 102 initialises a trust level indication for the UE 130. For instance, the initialised trust level indication is representative of a default trust level for the UE 130. As an illustrative example, the trust level indication is a value that is between 0 and 1, wherein 0 represents the lowest trust level and 1 represents the highest trust level. Therefore, in the step S502, the MME 102 initialises the trust level indication for the UE 130 to 0. The MME 102 preferably stores the trust level indication for the UE 130 in the UE context associated with the UE 130, but when providing the UE context to a base station, the MME 102 doesn't transmit UE context with the trust level indication.

In a following step S503, the MME 102 handles the trust level indication for the UE 130, as a function of the activity of the UE 130. The MME 102 increases the trust level indication under certain circumstances and decreases the trust level indication under other circumstances. Examples are presented hereafter with regard to FIGS. 6A, 6B and 6C. The trust level indication may, alternatively or further, depend on a time period elapsed since the last effective modification of the trust level indication as stored in the UE context for the UE 130 or since the last authorization from the MME 102 for the UE 130 to access via handover the services of the target base station 120. To be able to determine the time period elapsed since the last effective modification of the trust level indication or the last authorization from the MME 102, timestamp information is stored in association with the trust level indication as stored in the UE context for the UE 130, as detailed hereafter with regard to FIGS. 6A, 6B and 6C.

In a following step S504, the MME 102 checks whether the trust level, or the trust level indication, is above the already-mentioned first threshold. If the trust level for the UE 130 is above the first threshold, a step S505 is performed; otherwise the step S503 is repeated.

In the step S505, the MME 102 instructs the base stations to perform X2 handovers for following handovers concerning the UE 130 toward CSG cells with no access control by the MME 102. The MME 102 preferably indicates in the UE context for the UE 130 that the MME 102 has instructed X2 handovers for the UE 130 toward CSG cells with no access control by the MME 102; thus, when the MME 102 transmits the UE context to a base station, the base station is notified that the MME 102 has provided such instruction. In LTE, the MME 130 transmits a UE context to a base station with Initial Context Setup Request or UE Context Modification Request messages. The source base station 110 updates locally the UE context accordingly.

In a following step S506, the MME 102 handles the trust level indication for the UE 130, as a function of the activity of the UE 130. The step S506 is similar to the step S503.

In a following step S507, the MME 102 checks whether the trust level, or the trust level indication, is still above the first threshold. If the trust level for the UE 130 is still above the first threshold, the step S506 is repeated; otherwise the step S508 is performed.

In the step S508, the MME 102 instructs the base stations to stop performing X2 handovers with no access control by the MME 102 for the UE 130 toward CSG cells. The MME 102 therefore instructs to only perform handovers with access control by the MME 102 for the UE 130 toward CSG cells, the handover being either an S1 handover or an X2 handover for which access control has been requested by the source base station 110 beforehand. The MME 102 preferably indicates in the UE context for the UE 130 that the MME 102 instructs to only perform handovers with access control by the MME 102 for the UE 130 toward CSG cells; thus, when the MME 102 transmits the UE context to a base station, the base station is notified that the MME 102 has provided such instruction. The source base station 110 updates locally the UE context accordingly.

In one embodiment, the MME 102 periodically instructs to perform only handovers with access control by the MME 102 toward CSG cells, regardless of the trust level indications for UEs, in order to increase protection of services of the wireless cellular communications network 100 against malicious UEs, malicious UEs being UEs that modify their CSG whitelist to include CSG ID not corresponding to their subscription.

Figure 6A:
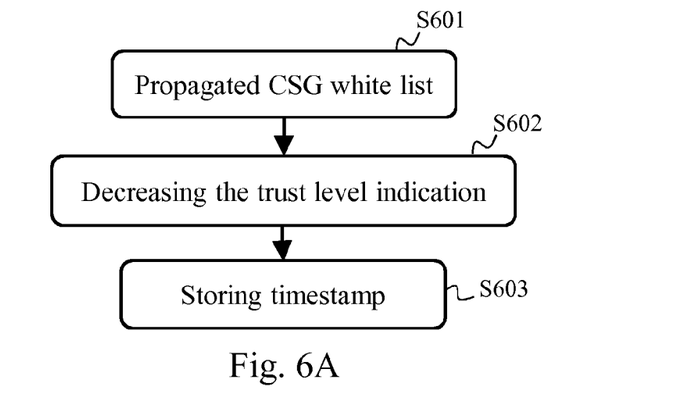
FIGS. 6A, 6B, and 6C schematically represent algorithms performed by the core network entity for handling a trust level indication, according to the first embodiment.
Figure 6B:
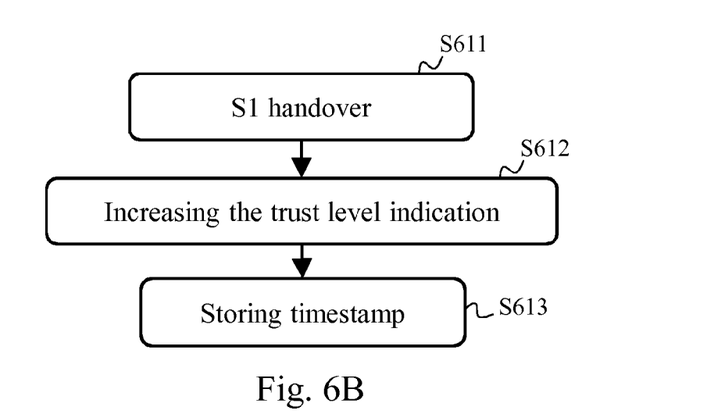
Figure 6C:
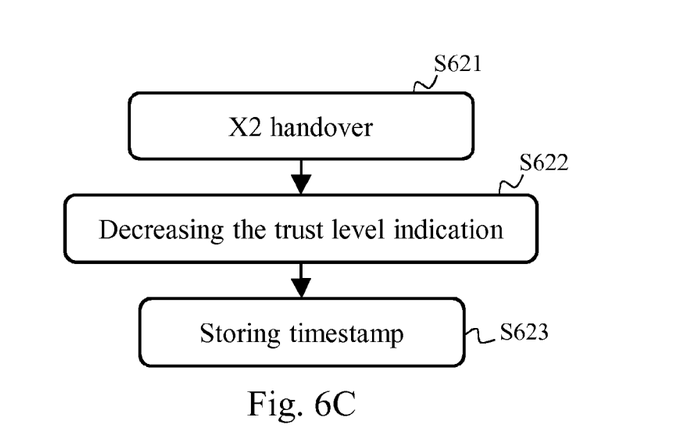

FIGS. 6A, 6B, and 6C schematically represent algorithms performed by the MME 102 for handling the trust level indication for the UE 130, as mentioned with regard to the steps 503 and 506.

According to FIG. 6A, in a step S601, the MME 102 detects that an up-to-date CSG whitelist has been propagated toward the UE 130. Then, in a following step S602, the MME 102 decreases the trust level indication for the UE 130. The decrease may correspond to subtracting a predefined value to the trust level indication or to setting the trust level indication to a predefined value, for instance lower than the first threshold. Indeed, it is advantageous to make the trust level indication be or tend to be below the first threshold in order to force the source base station 110 to request access control by the MME 102 when the CSG whitelist for the UE 130 is updated. Indeed, when an update of the CSG whitelist occurs, the information stored by the MME 102 might be up-to-date, whereas the information stored by the UE 130 might not yet have been updated. It might also be considered decreasing the trust level indication for the UE 130 only if a CSG has been removed from the subscription of the UE 130.

In a following step S603, the MME 102 stores a timestamp information in association with the trust level indication in the UE context of the UE 130. The timestamp information represents the instant at which the step S603 has been performed, i.e. the instant at which the trust level indication has been modified. The previously stored timestamp information in the UE context of the UE 130 is preferably overwritten or erased. Alternatively, when the trust level indication depends on the time period elapsed since the last authorization from the MME 102 for the UE 130 to access the services of the target base station 120, the step S603 is not performed.

According to FIG. 6B, in a step S611, the MME 102 detects that an S1 handover toward a CSG cell has been performed for the UE 130. Then, in a following step S612, the MME 102 increases the trust level indication for the UE 130. The increase may correspond to adding a predefined value to the trust level indication or to setting the trust level indication to a predefined value. For instance, the trust level indication may be set to its maximum possible value, namely 1 in the illustrative example already mentioned. In a variant, the trust level indication is determined as a function of a number of successful S1 handovers toward CSG cells and a number of unsuccessful S1 handovers toward CSG cells, possibly as follows:

$$TLI = \frac{m}{m+n}$$

wherein TLI represents the trust level indication for the UE 130, m represents a number of successful S1 handovers toward CSG cells for the UE 130 and n represents a number of unsuccessful S1 handovers toward CSG cells for the UE 130.

In a following step S613, the MME 102 stores a timestamp information in association with the trust level indication in the UE context of the UE 130. The timestamp information represents the instant at which the step S612 has been performed, i.e. the instant at which the trust level indication has been modified. The previously stored timestamp information in the UE context of the UE 130 is preferably overwritten or erased. Alternatively, when the trust level indication depends on the time period elapsed since the last authorization from the MME 102 for the UE 130 to access the services of the target base station 120, the timestamp information represents the instant at which the step S611 has been performed, i.e. the instant at which the MME 102 provided authorization for the UE 130 to access the services of the target base station 120.

More generally, the process described with regard to FIG. 6B may be applied when the MME 102 performs an access control for the UE 130, i.e. checks upon request from a base station whether the UE 130 has subscribed to a certain CSG. In this case, in the step S611, the MME 102 detects that a verification that a CSG ID provided by the base station is comprised in the CSG subscription of the UE 130 has been successfully performed.

According to FIG. 6C, in a step S621, the MME 102 detects that an X2 handover toward a CSG cell has been performed for the UE 130.

The MME 102 is able to determine that an X2 handover toward a CSG cell has been performed for the UE 130 when receiving a Path Switch message from the target base station 120. The MME 102 is therefore able to distinguish S1 handovers and X2 handovers.

When the base stations have the ability to select from X2 handover with prior access control and X2 handover without prior access control and when the MME 102 has instructed the source base station 110 to perform X2 handovers without access control, the MME 102 determines that an X2 handover has been performed without access control when receiving a Path Switch message for the UE 130 from the target base station 120. In this context, the MME 102 can determine the number of successive X2 handovers toward CSG cells without access control for the UE 130 by counting the number of successive Path Switch messages received for the UE 130.

Alternatively, when the base stations have the ability to select from X2 handover with prior access control and X2 handover without prior access control, the MME 102 may be informed by the target base station 120 whether the X2 handover has been performed with or without access control. The target base station 120 may inform the MME 102 by including the information in the Path Switch message, and the target base station 120 may obtain from the source base station 110 the information whether the X2 handover has been performed with or without access control.

Then, in a following step S622, the MME 102 decreases the trust level indication for the UE 130. The trust level indication is for instance determined as a function of a number of successive X2 handovers toward CSG cells without access control undergone by the UE 130 to enter the source cell, possibly as follows:

$$TLI(k)=\exp(-\alpha_1 k)*TLI(k-1)$$

wherein TLI represents the trust level indication for the UE 130, k represents said number of successive X2 handovers toward CSG cells without access control for the UE 130 and $\alpha_1$ represents a first forgetting factor.

The trust level indication may alternatively, or further, be determined as a function of the time period elapsed since the last instant at which the trust level indication has been modified, as introduced hereinbefore with regard to the steps S603 and S613 or when initializing the trust level indication for the UE 130 in the step S502, or when performing a step S623 described hereafter. Accordingly, the trust level indication is possibly as follows:

$$TLI(t')=\exp(-\alpha_2 T)*TLI(t)$$

wherein TLI represents the trust level indication for the UE 130, t' represents the current instant at which the trust level indication is updated, t represents the preceding instant at which the trust level indication has been modified, T represents the time period elapsed between the instant t and the instant t', and $\alpha_2$ represents a second forgetting factor.

In the following step S623, the MME 102 stores a timestamp information in association with the trust level indication in the UE context of the UE 130. The timestamp information represents the instant at which the step S622 has been performed, i.e. the instant at which the trust level indication has been modified. The previously stored timestamp information in the UE context of the UE 130 is preferably overwritten or erased. Alternatively, when the trust level indication depends on the time period elapsed since the last authorization from the MME 102 for the UE 130 to access the services of the target base station 120, the step S623 is not performed.

The aforementioned first $\alpha_1$ and second $\alpha_2$ forgetting factors control the decrease of the trust level indication with the number of X2 handovers toward CSG cells and with time respectively. The higher the values of the first $\alpha_1$ and second $\alpha_2$ forgetting factors, the lower the mean number of X2 handovers toward CSG cells, compared to the number of S1 handovers toward CSG cells. Reversely, the lower the values of the first $\alpha_1$ and second $\alpha_2$ forgetting factors, the higher the mean number of X2 handovers toward CSG cells, compared to the number of S1 handovers toward CSG cells.

The trust level indication is thus defined on the basis of at least one parameter weighted by at least one respective forgetting factor, and the at least one forgetting factor may be adjusted by the MME 102 on the basis of an offload policy of signalling from the core network toward base stations.

Figure 7:
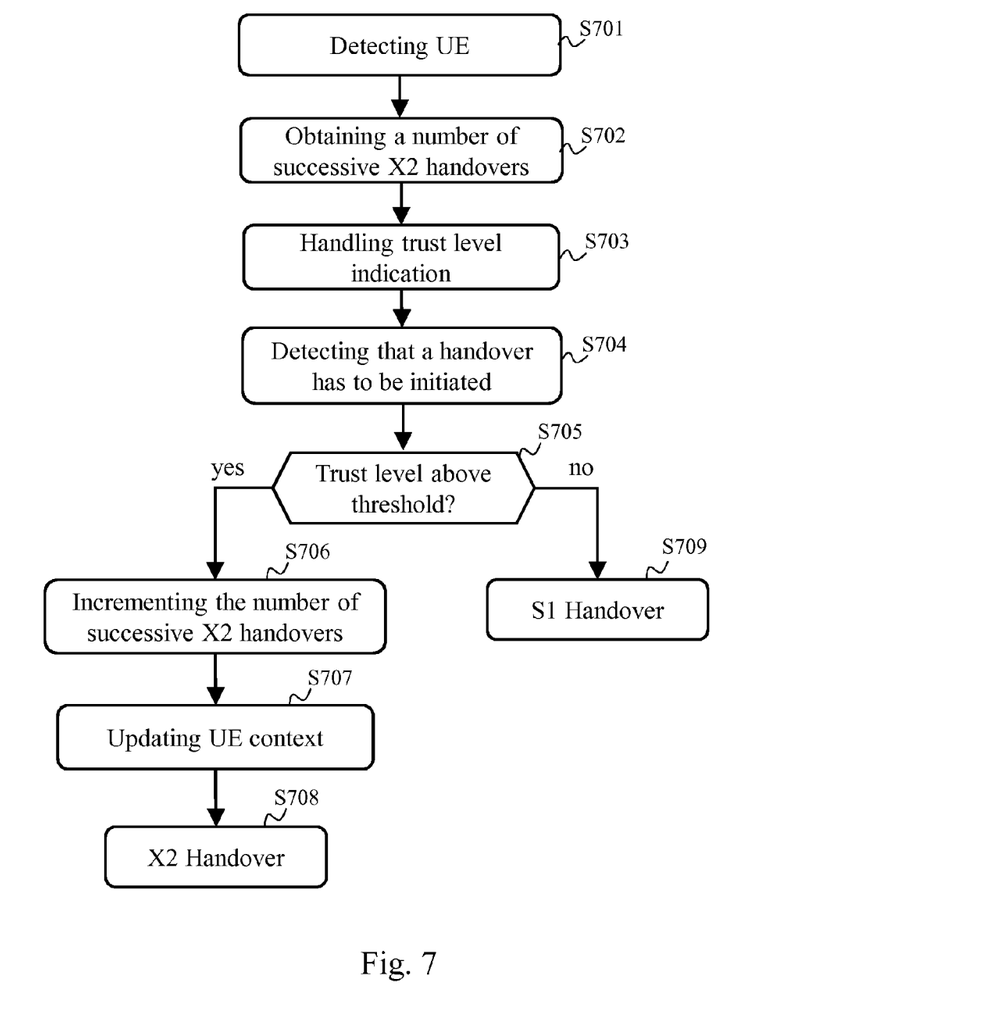
FIG. 7 schematically represents an algorithm performed by the source base station for performing the handover, according to a second embodiment.

FIG. 7 schematically represents an algorithm performed by the source base station 110 for performing the handover, according to the second embodiment.

In a step S701, the source base station 110 detects the presence of the UE 130 in the source cell. The source base station 110 for instance detects that the UE 130 wakes up in the source cell, or switches from idle mode to active mode in the source cell, or that the UE 130 enters the source cell after a handover from another cell.

In a following step S702, the source base station 110 obtains a number of successive X2 handovers toward CSG cells without access control undergone by the UE 130 to enter the source cell. If the UE 130 switched from idle mode to active mode in the source cell, this number of successive X2 handovers toward CSG cells without access control is set to 0. If the UE 130 enters the source cell after an X2 handover from another cell, the source base station 110 obtains this number of successive X2 handovers toward CSG cells without access control by extracting it from the UE context received from the base station managing said another cell. If the UE 130 enters the source cell after an S1 handover from another cell, the number of successive X2 handovers toward CSG cells without access control for the UE 130 is set to 0.

As already explained with regard to FIG. 6C, the trust level indication may be determined as a function of this number of successive X2 handovers toward CSG cells without access control.

In a following step S703, the source base station 110 handles the trust level indication for the UE 130, as a function of the activity of the UE 130. The source base station 110 increases the trust level indication under certain circumstances and decreases the trust level indication under other circumstances. Examples are presented hereafter with regard to FIGS. 8A, 8B, 8C and 8D. The source base station 110 preferably stores the trust level indication in the UE context associated with the UE 130. The trust level indication may, alternatively or further, depend on a time period elapsed since the last effective modification of the trust level indication as stored in the UE context for the UE 130. To be able to determine the time period elapsed since the last effective modification of the trust level indication, timestamp information is stored in association with the trust level indication as stored in the UE context for the UE 130, as detailed hereafter with regard to FIGS. 8A, 8B and 8D.

In a following step S704, the source base station 110 detects that a handover has to be performed toward the target cell for the UE 130, following a measurement report transmitted by the UE 130, as already explained with regard to the step S401.

In a following step S705, the source base station 110 checks whether the trust level, or the trust level indication, is above the already-mentioned first threshold. If the trust level for the UE 130 is above the first threshold, a step S706 is performed; otherwise a step S709 is performed, in which an S1 handover is performed toward the target cell for the UE 130. As already explained with regard to the step S405, the handover may consist in, first, requesting access control by the MME 102 or another core network entity and, then, performing an X2 handover toward the target cell. In the step 709, the number of successive X2 handovers toward CSG cells without access control, which was obtained in the step S702, is reset whatever an X2 or an S1 handover is performed.

In the step S706, the source base station 110 increments by one unit the number of successive X2 handovers toward CSG cells without access control, which was obtained in the step S702.

In a following step S707, the source base station 110 preferably updates the UE context for the UE 130 by storing the incremented number of successive X2 handovers toward CSG cells without access control.

In a following step S708, an X2 handover is performed toward the target cell for the UE 130, as already explained with regard to the step S404. It should be noticed that, as the UE context associated with the UE 130 is transmitted from the source base station 110 to the target base station 120 during the X2 handover, the target base station 120 is notified of the up-to-date number of successive X2 handovers toward CSG cells without access control for the UE 130 and/or of the trust level indication for the UE 130.

In a variant, the step S706 is not performed by the source base station 110 but by the target base station 120, once the X2 handover has been performed.

In one embodiment, when handling the trust level indication for the UE 130, the source base station 110 may detect that said trust level indication becomes below the first threshold. The source base station 110 may in this case request authorization from the MME 102 for the UE 130 to access the services of the target base station 120, although no handover toward the target cell is expected yet. The source base station 110 can then adjust the trust level indication according to whether the MME 102 grants the UE 130 access to the services of the target base station 120.

FIGS. 8A, 8B, 8C and 8D schematically represent algorithms performed by the source base station 110 for handling the trust level indication for the UE 130, as mentioned with regard to the step 703.

Figure 8A:
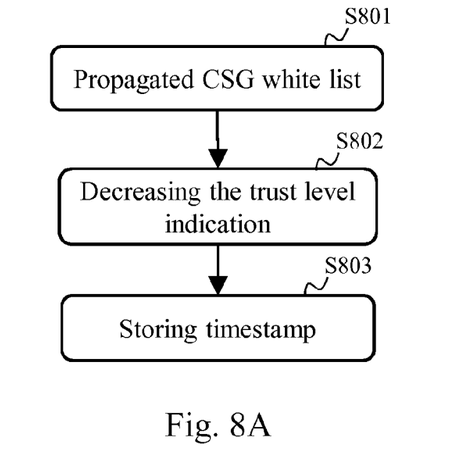
FIGS. 8A, 8B, 8C and 8D schematically represent algorithms performed by the source base station for handling the trust level indication, according to the second embodiment.

According to FIG. 8A, in a step S801, the source base station 110 detects that an up-to-date CSG whitelist has been propagated from the MME 102 toward the UE 130. Indeed, as the UE 130 is located in the source cell, when the MME 102 transmits the up-to-date CSG whitelist to the UE 130, the CSG whitelist is propagated via the source base station 110. Then, in a following step S802, the source base station 110 decreases the trust level indication for the UE 130. The decrease may correspond to subtracting a predefined value to the trust level indication or to setting the trust level indication to a predefined value, as already explained with regard to FIG. 6A.

In a following step S803, the source base station 110 stores a timestamp information in association with the trust level indication in the UE context of the UE 130. The timestamp information represents the instant at which the step S802 has been performed, i.e. the instant at which the trust level indication has been modified. The previously stored timestamp information in the UE context of the UE 130 is preferably overwritten or erased. Alternatively, when the trust level indication depends on the time period elapsed since the last authorization from the MME 102 for the UE 130 to access the services of the target base station 120, the step S803 is not performed.

Figure 8B:
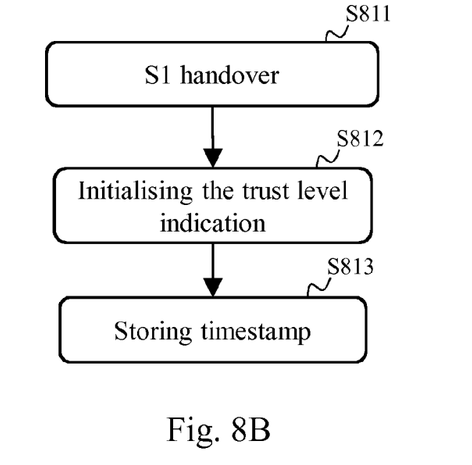

According to FIG. 8B, in a step S811, the source base station 110 detects that an S1 handover toward a CSG cell has been performed for the UE 130, when the UE 130 entered the source cell. Then, in a following step S812, the source base station 110 initialises or increases the trust level indication for the UE 130. The initialisation corresponds to setting the trust level indication to a predefined value. For instance, the trust level indication may be set to its maximum possible value, namely 1 in the illustrative example already mentioned. The step S812 may also consist in increasing the trust level indication, as already explained with regard to FIG. 6B.

In a following step S813, the source base station 110 stores a timestamp information in association with the trust level indication in the UE context of the UE 130. The timestamp information represents the instant at which the step S812 has been performed, i.e. the instant at which the trust level indication has been modified. The previously stored timestamp information in the UE context of the UE 130 is preferably overwritten or erased. Alternatively, when the trust level indication depends on the time period elapsed since the last authorization from the MME 102 for the UE 130 to access the services of the target base station 120, the timestamp information represents the instant at which the step S811 has been performed, i.e. the instant at which the MME 102 provided authorization for the UE 130 to access the services of the target base station 120.

Figure 8C:
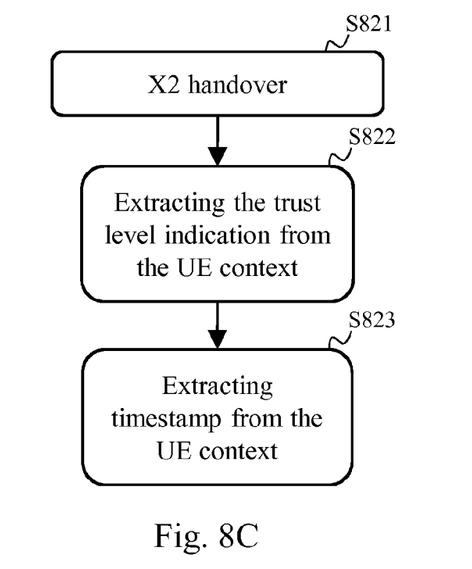

According to FIG. 8C, in a step S821, the source base station 110 detects that an X2 handover has been performed for the UE 130, which made the UE 130 enter the source cell. Then, in a following step S822, the source base station 110 extracts the trust level indication from the UE context for the UE 130 transmitted by the source base station 110 during the X2 handover.

Figure 8D:
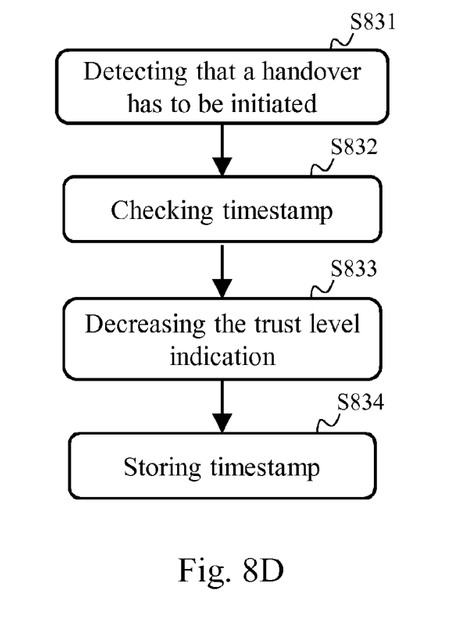

According to FIG. 8D, in a step S831, the source base station 110 detects that a handover has to be initiated for the UE 130. The trust level indication may be determined as a function of the time period elapsed since the last instant at which the trust level indication has been modified. In a following step S832, the source base station 110 checks the timestamp information associated with the trust level indication, in order to determine the time period elapsed since the last instant at which the trust level indication has been modified, as introduced hereinbefore with regard to the steps S803 and S813. Accordingly, the trust level indication is possibly as follows:

$$TLI(t')=\exp(-\alpha a_2 T)*TLI(t)$$

wherein TLI represents the trust level indication for the UE 130, t' represents the instant at which the source base station 110 detects that a handover has to be initiated for the UE 130, i.e. the current instant at which the trust level indication is updated, t represents the preceding instant at which the trust level indication has been modified, T represents the time period elapsed between the instant t and the instant t', and $\alpha_2$ represents the already-mentioned second forgetting factor.

As already mentioned with regard to the first embodiment, the first $\alpha_1$ and second $\alpha_2$ forgetting factors control the decrease of the trust level indication with the number of X2 handovers toward CSG cells and with time respectively.

The trust level indication is thus defined on the basis of at least one parameter weighted by at least one respective forgetting factor, and the at least one forgetting factor may be adjusted by the target base station 120 on the basis of an access policy to the services of the target base station.

The first $\alpha_1$ and second $\alpha_2$ forgetting factors may be predefined and stored in the base stations, for instance during the manufacturing process. In a variant, the first $\alpha_1$ and/or second $\alpha_2$ forgetting factors may be defined by the MME 102, or another core network entity, for each base station independently or per group of base stations. For example, OAM (Operation Administration and Maintenance) of the wireless cellular communications network 100 allows setting the first $\alpha_1$ and/or second $\alpha_2$ forgetting factors for at least one group of base stations, on the basis of traffic estimation in the cells managed by said at least one group of base stations and/or a trade-off between access control and offload policy of the core network 101. In another variant, the first $\alpha_1$ and/or second $\alpha_2$ forgetting factors are defined by each base station. For instance, a base station decides increasing the first $\alpha_1$ and/or second $\alpha_2$ forgetting factors if said base station detects at least one malicious UE in the cell managed by said base station. A malicious UE is for instance a UE that presented several times an erroneous CSG membership.

In a following step S834, the source base station 110 stores a timestamp information in association with the trust level indication in the UE context of the UE 130. The timestamp information represents the instant at which the step S833 has been performed, i.e. the instant at which the trust level indication has been modified. The previously stored timestamp information in the UE context of the UE 130 is preferably overwritten or erased. Alternatively, when the trust level indication depends on the time period elapsed since the last authorization from the MME 102 for the UE 130 to access the services of the target base station 120, the step S834 is not performed.

Figure 9A:
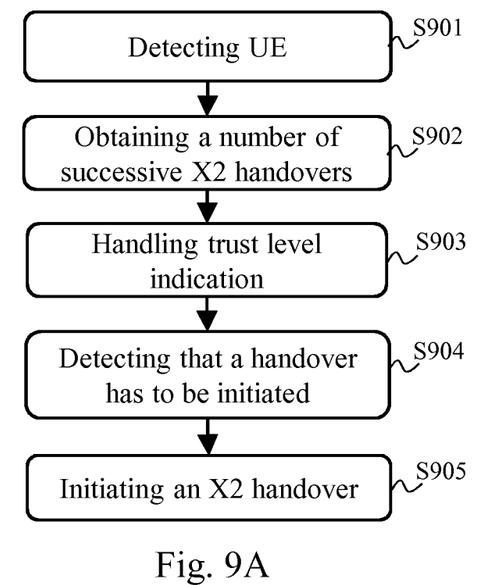
FIGS. 9A and 9B schematically represent algorithms performed by the source base station and a target base station respectively for performing the handover, according to a third embodiment.

FIG. 9A schematically represents an algorithm performed by the source base station 110 for performing the handover, according to the third embodiment.

In a step S901, the source base station 110 detects the presence of the UE 130 in the source cell. The source base station 110 for instance detects that the UE 130 wakes up in the source cell, or switches from idle mode to active mode in the source cell, or that the UE 130 enters the source cell after a handover from another cell.

In a following step S902, the source base station 110 obtains a number of successive X2 handovers toward CSG cells without access control undergone by the UE 130 to enter the source cell, as already described with regard to the step S702.

In a following step S903, the source base station 110 handles the trust level indication for the UE 130, as a function of the activity of the UE 130. The source base station 110 increases the trust level indication under certain circumstances and decreases the trust level indication under other circumstances. Examples have been already presented hereinbefore with regard to FIGS. 8A, 8B, 8C and 8D. The source base station 110 preferably stores the trust level indication in the UE context associated with the UE 130.

In a preferred variant, the steps 902 and 903 are performed by the target base station 120, in order to limit the processing by the source base station 110.

In this case, the source base station 110 provides the UE context to the target base station, or information therein related to the trust level indication, and the target base station 120 handles the trust level indication for the UE 130, as well as the number of successive X2 handovers toward CSG cells without access control.

In a following step S904, the source base station 110 detects that a handover has to be performed toward the target cell for the UE 130, following a measurement report transmitted by the UE 130, as already explained with regard to the step S401.

In a following step S905, the source base station 110 initiates an X2 handover with the target base station 120. During the initiation of the X2 handover, the source base station 110 provides to the target base station 120 the trust level indication for the UE 130, as well as the CSG membership provided by the UE 130.

Figure 9B:
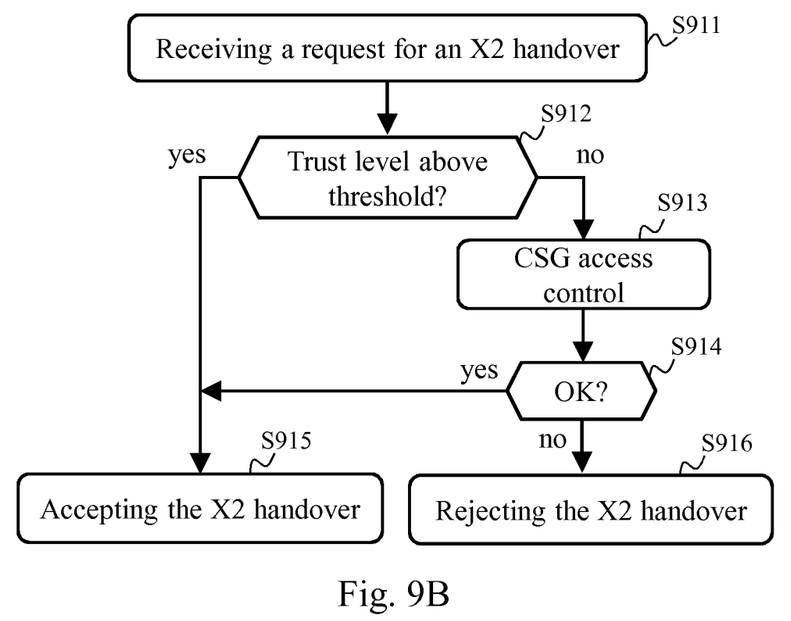

FIG. 9B schematically represents an algorithm performed by the target base station 120 for performing the handover, according to the third embodiment.

In a step S911, the target base station 120 receives from the source base station 110 a request to perform an X2 handover toward the target cell for the UE 130. It corresponds to the X2 handover initiation performed by the source base station 110 in the step 905. The target base station 120 therefore receives from the source base station 110 the trust level indication for the UE 130, as well as the UE membership indication provided by the UE 130. The target base station 120 may further receive other information related to the trust level indication for the UE 130, such as the aforementioned timestamp information and/or the number of successive X2 handovers toward CSG cells without access control undergone by the UE 130.

In a following step S912, the target base station 120 checks whether the trust level, or the trust level indication, is above the already-mentioned first threshold. If the trust level for the UE 130 is above the first threshold, a step S915 is performed; otherwise a step S913 is performed.

In the step S913, the target base station 120 requests that the CSG subscription for the UE 130 be verified by the MME 102 or another core network entity. The target base station 120 provides the UE membership indication and the CSG ID of the target cell to the MME 102 for checking. The MME 102 checks, in collaboration with the CSG server, that the UE membership indication is conform to the CSG subscription for the UE 130, and that the UE 130 is authorized to access the target cell.

In a following step S914, the target base station 120 checks whether the MME 102 has granted the access to the services of the target base station 120 for the UE 130. If the access to the services of the target base station 120 is granted, a step S916 is performed, in which the X2 handover is rejected by the target base station 120; otherwise, the step S915 is performed.

In the step S915, the X2 handover is accepted by the target base station 120 and continued between the source base station 110 and the target base station 120 for the UE 130.

The first threshold with which the trust level indication for the UE 130 is compared, in either the first, the second or the third embodiment detailed hereinbefore, may be common to any UE present or requesting entering in a cell where this first threshold is applicable. In a variant, the first threshold may be particular to each UE.

According to an embodiment, the first threshold is setup by the MME 102, or another entity of the core network 101. For instance, the first threshold is provided by the MME 102 during message exchanges for configuring the wireless cellular communications network 100 when connecting the source base station and/or target base station to the MME 102. The first threshold may be common to all UEs and be identical for plural neighbouring base stations. The MME 102, or said another entity of the core network 101, determines the first threshold on the basis of an offload policy of the core network 101 toward the base stations.

According to another embodiment, the first threshold is defined by the target base station 120 for the source base station 110, according to an access policy to services implemented by the target base station 120. For example, the target base station 120 decides to increase the first threshold for the source base station 110, so handovers with access control are preferred and the level of the signalling offload is reduced for the handovers toward the target base station 120. If the target base station 120 reduces the first threshold, direct handovers without access control is preferred and another access control policy is defined at the target base station 120, as access control is not systematic for handovers toward the target base station 120. The compromise between access control and signalling offload level defines an access control policy for the services of the target base station 120. The target base station 120 defines the first threshold for all UEs according to its access policy and propagates the first threshold value to its neighbouring base stations, including the source base station 110, via its X2 interface. The neighbouring base stations, including the source base station 110, then replace the preceding value of the first threshold by the value of the first threshold provided by the target base station 120.

According to yet another embodiment, the first threshold is adjusted by the target base station 120 for the source base station 110, according to the access policy to services implemented by the target base station 120. The target base station 120 defines a value of increase or decrease of the first threshold for all UEs according to its access policy and propagates the value of increase or decrease to its neighbouring base stations, including the source base station 110, via its X2 interface. The neighbouring base stations, including the source base station 110, then increases or decreases respectively the preceding value of the first threshold by the value provided by the target base station 120. It allows managing the first threshold independently for each UE.

The invention claimed is:

1. A method for performing a handover of a mobile terminal from a source base station to a target base station, the source and target base stations being adapted to directly communicate with each other via first respective communication interfaces, the source and target base stations being adapted to communicate via second respective communication interfaces with a core network entity, the core network entity managing subscriptions to services of at least the target base station and authorizing access to said services via handover to only subscribers to said services, said method comprising:
obtaining a trust level indication for the mobile terminal, said trust level indication being representative of an extent to which the mobile terminal can be trusted when declaring having subscribed to the services of the target base station;
performing directly the handover via the first communication interfaces, when the obtained trust level indication is above a first threshold; and otherwise
requesting authorization from said core network entity for the mobile terminal to access via handover the services of the target base station.

2. The method according to claim 1, wherein the trust level indication is determined as a function of a time period elapsed since a preceding modification of the trust level indication or since a preceding authorization from the core network entity for the mobile terminal to access via handover the services of the target base station.

3. The method according to claim 1, wherein the trust level indication is determined as a function of a number of successive handovers performed by base stations by directly communicating with each other without requesting authorization from said core network entity and undergone by the mobile terminal to enter a cell managed by the source base station.

4. The method according to claim 1, wherein the core network entity defines the first threshold on the basis of an offload policy of signalling from the core network toward base stations.

5. The method according to claim 1, wherein the target base station defines or adjusts the first threshold for the source base station, on the basis of an access policy to the services of the target base station.

6. The method according to claim 1, wherein the trust level indication is defined on the basis of at least one parameter weighted by at least one respective forgetting factor, and wherein:
the at least one forgetting factor is adjusted by said core network entity on the basis of an offload policy of signalling from the core network toward base stations; or
the at least one forgetting factor is adjusted by the target base station on the basis of an access policy to the services of the target base station.

7. The method according to claim 1, wherein the target base station performs:
receiving from the source base station a request to perform directly the handover via the first communication interfaces for the mobile terminal and receiving from the source base station said trust level indication;
accepting to perform directly the handover via the first communication interfaces for the mobile terminal, when the trust level indication is above a first threshold; and otherwise
requesting, via the second communication interface of the target base station, authorization from said core network entity for the mobile terminal to access via handover the services of the target base station.

8. The method according to claim 1, wherein the core network entity performs, when the trust level indication is above the first threshold:
instructing the source base station to perform directly, via the first communication interfaces, following handovers toward the target base station for the mobile terminal.

9. The method according to claim 8, wherein the source base station performs, when detecting that the handover has to be performed toward the target base station for the mobile terminal:
performing the handover via its first communication interface, when instructed by the core network entity to perform directly, via the first communication interfaces, handovers toward the target base station via the first communication interfaces for the mobile terminal; and otherwise
requesting, via the second communication interface of the source base station, authorization from said core network entity for the mobile terminal to access via handover the services of the target base station.

10. The method according to claim 8, wherein the core network entity performs, when the trust level indication is below or equal to the first threshold:

instructing the source base station to stop performing directly, via the first communication interfaces, following handovers toward the target base station for the mobile terminal.

11. The method according to claim 8, wherein the source base station performs, when detecting that the mobile terminals enters a cell managed by the source base station:

obtaining a number of successive handovers performed by base stations by directly communicating with each other without requesting authorization from said core network entity and undergone by the mobile terminal to enter the cell managed by the source base station;

and, when detecting that the handover has to be performed toward the target base station for the mobile terminal:

performing directly the handover via its first communication interface, when said number of successive handovers is below a second threshold, independently of being instructed by the core network entity to perform directly, via the first communication interfaces, following handovers toward the target base station for the mobile terminal; and otherwise requesting, via the second communication interface of the source base station, authorization from said core network entity for the mobile terminal to access via handover the services of the target base station.

12. The method according to claim 1, wherein said method is performed by the source base station.

13. The method according to claim 12, wherein, when the handover is performed directly via the first communication interfaces, the source base station transmits to the target base station a mobile terminal context including the trust level indication and/or a number of successive handovers performed by base stations by directly communicating with each other without requesting authorization from said core network entity and undergone by the mobile terminal to enter a cell managed by the source base station.

14. The method according to claim 1, wherein requesting authorization from said core network entity for the mobile terminal to access via handover the services of the target base station is performed when performing the handover via the second communication interfaces.

15. A system for performing a handover of a mobile terminal from a source base station to a target base station, the source and target base stations being adapted to directly communicate with each other via first respective communication interfaces, the source and target base stations being adapted to communicate via second respective communication interfaces with a core network entity, the core network entity managing subscriptions to services of at least the target base station and authorizing access to said services via handover to only subscribers to said services, said system comprising:

means for obtaining a trust level indication for the mobile terminal, said trust level indication being representative of an extent to which the mobile terminal can be trusted when declaring having subscribed to the services of the target base station;

means for performing directly the handover via the first communication interfaces, when the obtained trust level indication is above a first threshold; and otherwise means for requesting authorization from said core network entity for the mobile terminal to access via handover the services of the target base station.

* * * * *